(No Model.) 7 Sheets—Sheet 4.

P. SOHÈGE.
MACHINE FOR MOLDING PAPER STUFF BOXES.

No. 516,946. Patented Mar. 20, 1894.

Witnesses
J. A. Rutherford
Robert Everett

Inventor
Paul Sohège
By James L. Norris,
Attorney (No Model.) 7 Sheets—Sheet 5.
P. SOHÈGE.
MACHINE FOR MOLDING PAPER STUFF BOXES.
No. 516,946. Patented Mar. 20, 1894.

UNITED STATES PATENT OFFICE.

PAUL SOHÈGE, OF PARIS, FRANCE.

MACHINE FOR MOLDING PAPER-STUFF BOXES.

SPECIFICATION forming part of Letters Patent No. 516,946, dated March 20, 1894.

Application filed October 10, 1891. Serial No. 408,395. (No model.) Patented in France August 20, 1890, No. 207,735; in Belgium September 11, 1891, No. 96,358; in England September 12, 1891, No. 15,495; in Germany September 15, 1891, No. 64,406, and in Austria-Hungary July 6, 1892, No. 5,024 and No. 21,772.

*To all whom it may concern:*

Be it known that I, PAUL SOHÈGE, a citizen of France, residing at Paris, in the Department of the Seine, France, have invented new and useful Improvements in Machines for Molding Paper-Stuff Boxes, (for which I have obtained Letters Patent in France, No. 207,735, dated August 20, 1890; in Belgium, No. 96,358, dated September 11, 1891; in Germany, No. 64,406, dated September 15, 1891; in Great Britain, No. 15,495, dated September 12, 1891, and in Austria-Hungary, dated July 6, 1892, No. 5,024 and No. 21,772,) of which the following is a specification.

The present invention consists first in a novel process, or mode of operation, for the manufacture of boxes from paper-pulp, and second, in certain improvements in mechanism for the practice of said process.

To enable others skilled in the art to which said invention pertains, to understand and practice said process, and to make, construct and use the apparatus devised for practicing the same, a description thereof will be given, in detail, reference being had, for such purpose, to the accompanying drawings in which—

The machine is composed of a press-body 1, of suitable form, and mounted upon a base 1ª. Within the said press-body 1 is contained a cylindrical piston, or plunger, 2, provided upon its upper end with a collar, or broad flange 3. Upon the upper, horizontal surface of this collar is mounted the matrix 4, having a bottom-piece 3ª, resting in a countersunk seat in the upper end of the cylindrical piston 2. The construction and operation of the matrix will be particularly explained below.

The matrix, in this machine, is composed of four independent parts, two of which are indicated by the reference-numeral 4, and two by the numeral 4ª. Said parts are connected and held together by clasps 8, each rigidly fastened at one end to one of the separate parts of the matrix, and having the other end engaged with a seat or depression 8ª, in the neighboring part of said matrix in such manner that there shall be a slip-connection between the latter and the said clasp.

Figure 2:
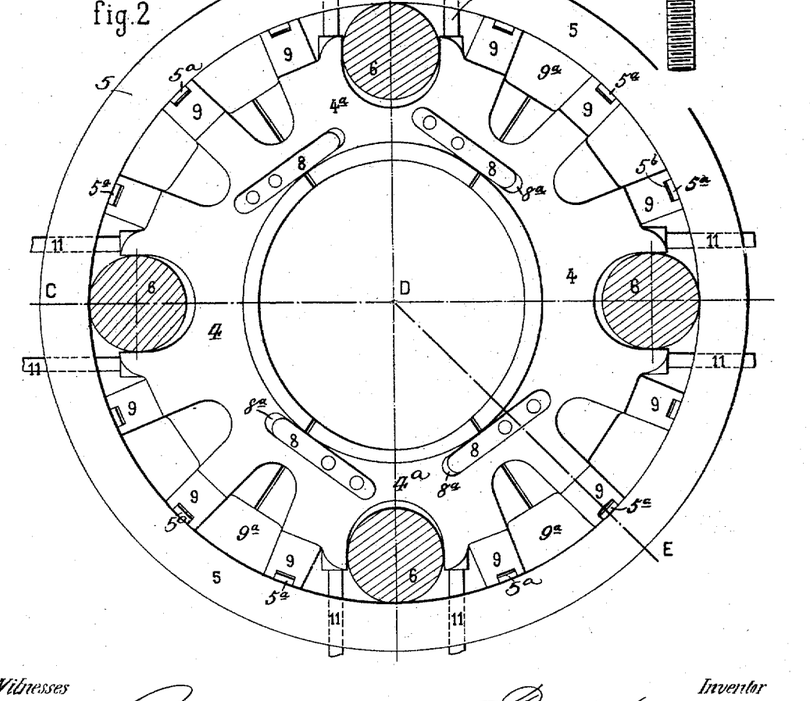
Fig. 2 is a horizontal section of the same upon the line A—B, Fig. 1, showing the matrix in plan.

The independent parts 4 and 4ª of the matrix are approximately segmental in form, the segments 4 usually including an arc somewhat in excess of ninety degrees, the segments 4ª being less than an arc of ninety degrees, in the same proportion so that one of the segments 4, taken together with one of the segments 4ª, will very nearly, if not quite, measure a semi-circle. (Fig. 2.)

Figure 1:
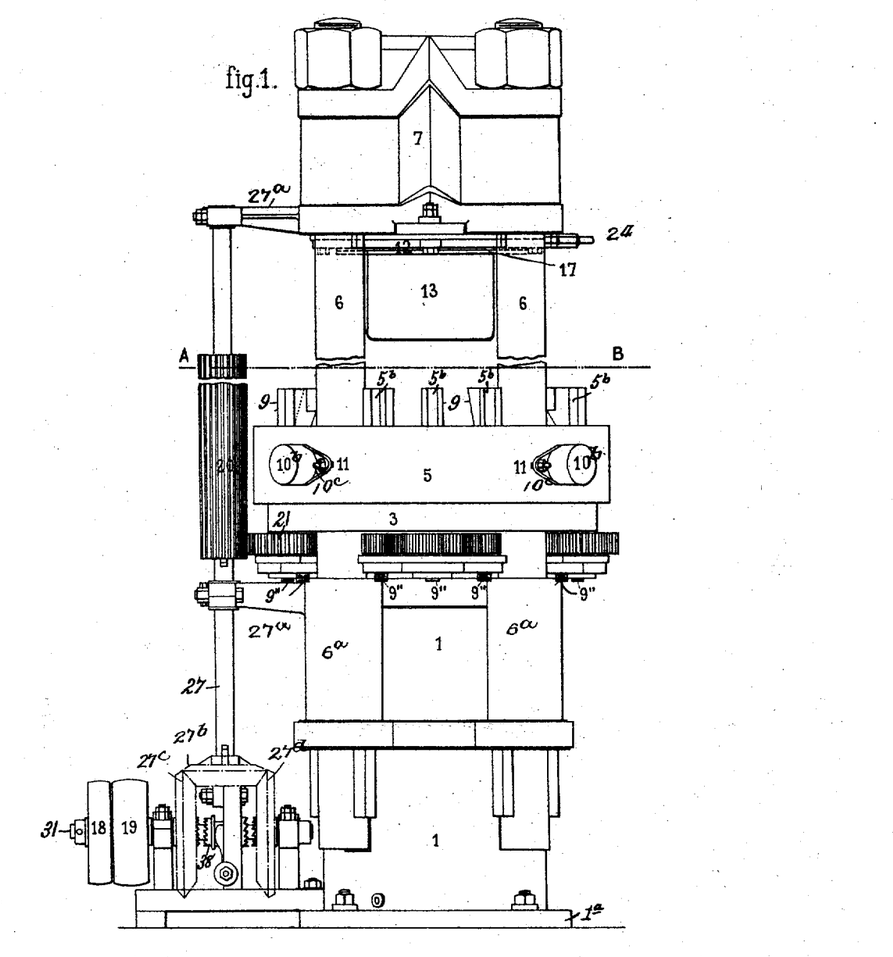
Figure 1 is an elevation of a machine specially adapted for the practice of the process which constitutes the first part of the invention.
Figure 3:
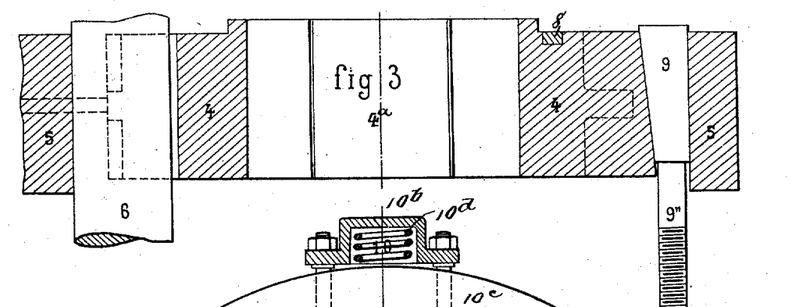
Fig. 3 is a vertical section of the matrix, taken upon the line C—D—E, Fig. 2.
Figure 4:
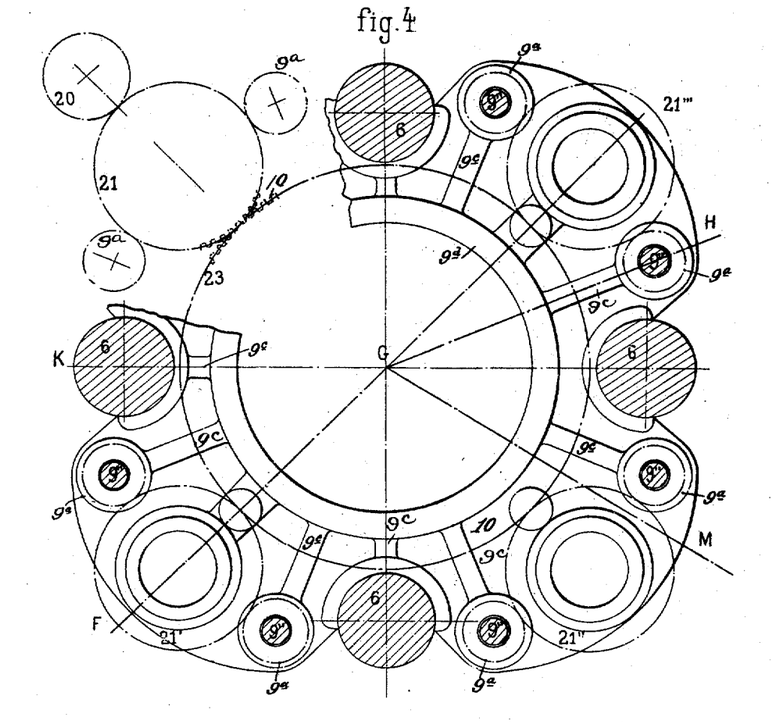
Fig. 4 is a view in plan of the plate-support of the meshing gears.
Figure 5:
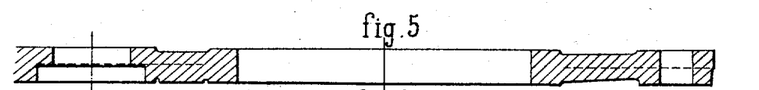
Fig. 5 is a vertical section of the same, taken upon the line F, G, H, Fig. 4; the plate-support being removed from the machine.
Figure 6:
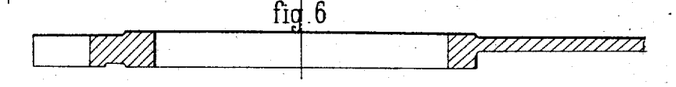
Fig. 6 is a section upon the line K, C, M, Fig. 4.
Figure 7:
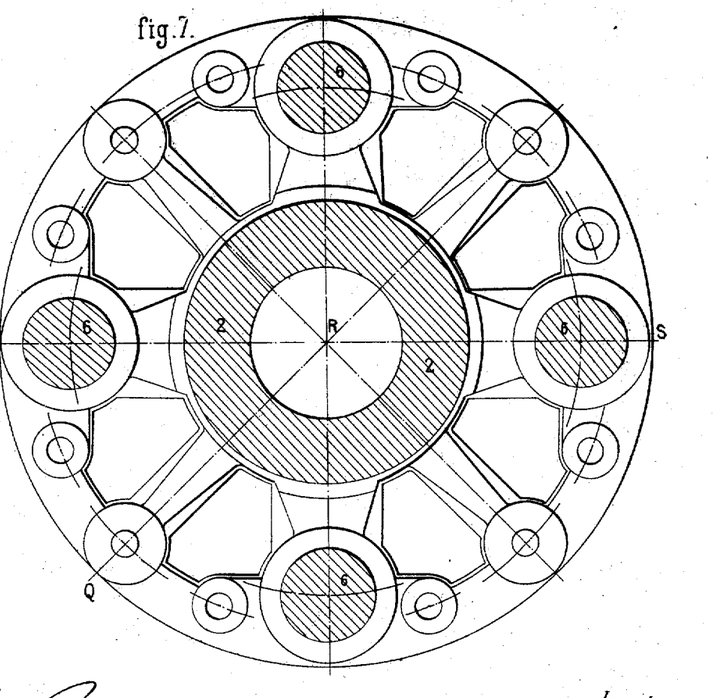
Fig. 7 is a horizontal section, taken in the plane N—P, in Fig. 8, showing the parts above the said plane.
Figure 8:
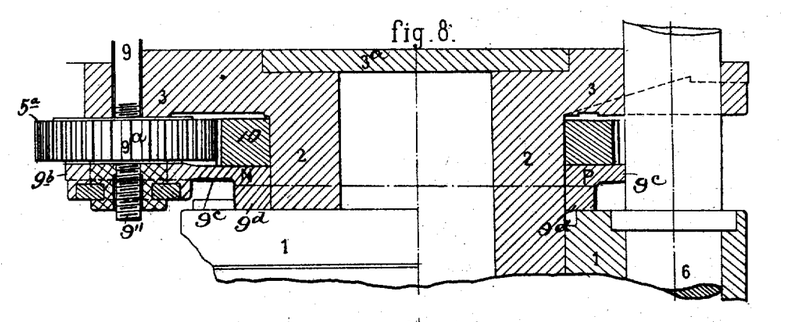
Fig. 8 is a vertical section taken on the line Q, R, S, Fig. 7.
Figure 9:
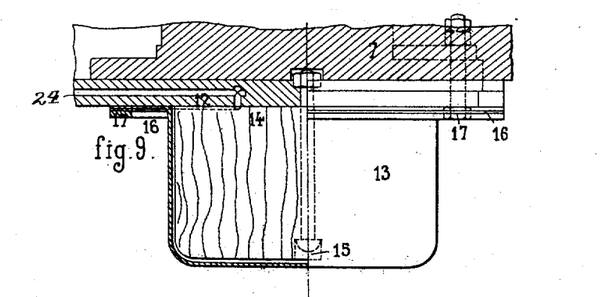
Fig. 9 is a view showing the construction of the mandrel the left hand portion of the figure being in diametrical section, and the right hand portion in elevation.
Figure 10:
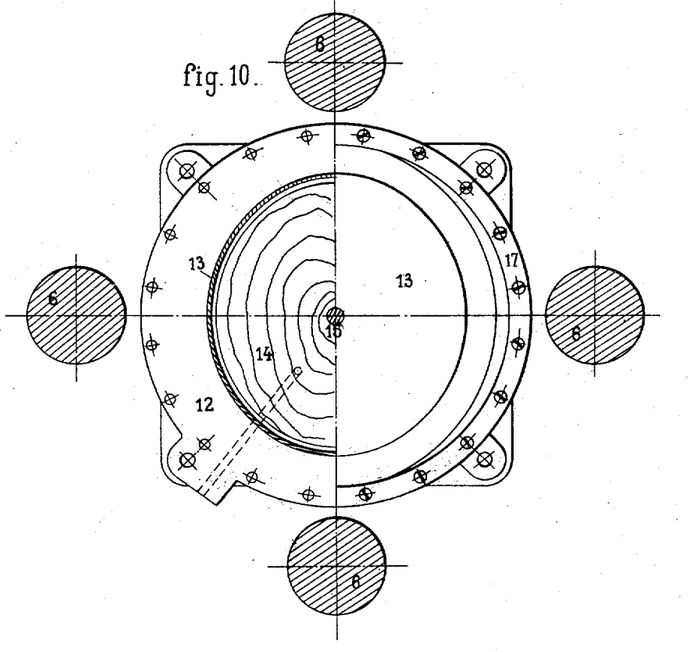
Fig. 10 is a view of the parts shown in Fig. 9, partly in horizontal section and partly in plan view, inverted.
Figure 11:
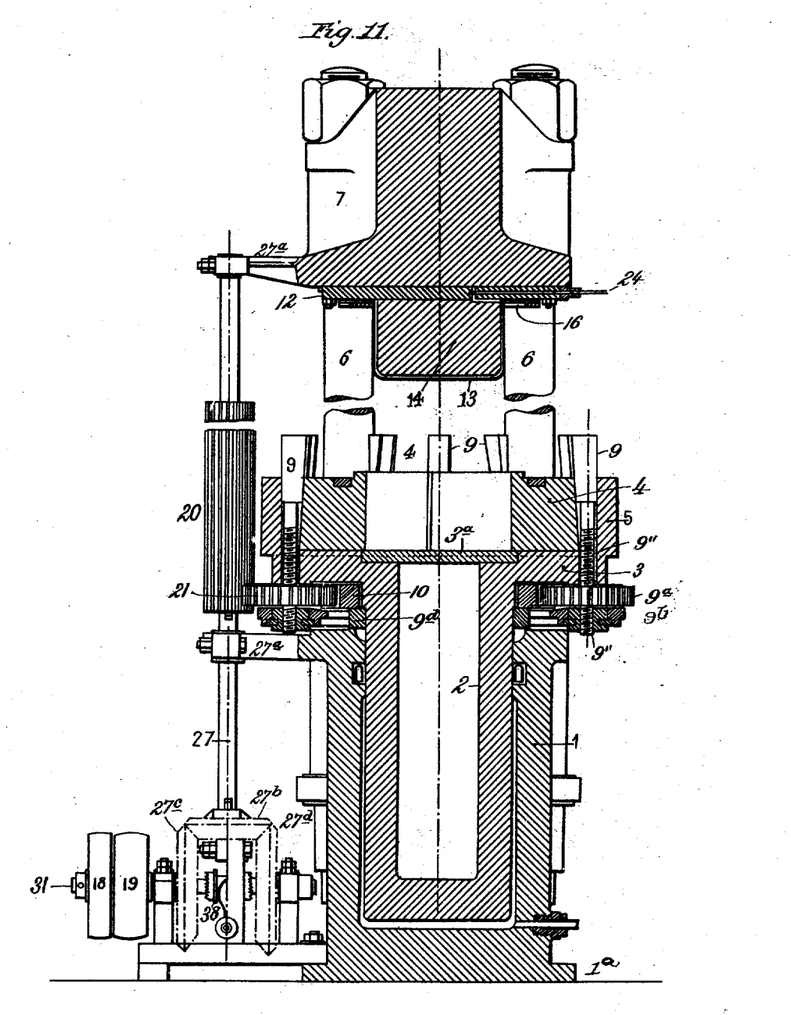
Fig. 11 is a central vertical section of the machine illustrated in Fig. 1.
Figure 12:
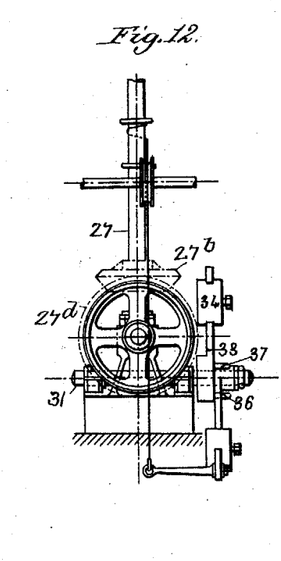
Fig. 12 is a detail view, to more fully illustrate the "change-gear" controlling the operation of the vertical shaft by which the matrix is closed and opened.

The four segmental parts of the matrix are supported upon the broad collar 3 (Figs. 1 and 11) and are capable of a limited movement toward and from the vertical, axial line, or center, of the matrix. This inward movement is produced by a series of quoins, 9, arranged in an annular space 9ª), between the outer faces of the segmental parts of the matrix and a ring 5, concentric with and surrounding the matrix. The inner faces of the quoins are slightly inclined, (Figs. 3 and 11,) and bear against correspondingly inclined outer faces upon the segmental parts 4 and 4ª of the matrix, while the outer, vertical faces of the said quoins have bearing against the inner, vertical face of the ring 5. Said quoins are guided in vertical lines by means of ribs, or splines, 5ª, formed upon the inside face of the ring 5, and fitted within channels 5ᵇ, formed in the outer faces of the quoins 9, (Figs. 1, 2, and 11.) At their lower ends said quoins are provided with vertical bars 9‴, which are screw-threaded throughout a suitable portion of their length, to engage with the interiorly threaded centers of spur-gears 9ª. These gears have support between the lower face of the outwardly projecting collar 3, on the upper end of the cylindrical piston 2, and a series of bearings 9ᵇ, mounted upon the ends of radially extended arms 9ᶜ which extend from a ring 9ᵈ, which surrounds the cylindrical piston 2, at a point a little below the lower face of the collar 3. These bearings are shown in Fig. 4, from which it will be seen that they are arranged at substantially equal intervals in the space between the ring 5 and the outer faces of the segmental members of the matrix. The threaded ends of the bars 9″ pass downward through the outer portion of the collar 3, through the interiorly threaded hubs of the spur-gears 9ª and through the bearings, or supports, 9ᵇ. Revolution is imparted to the series of spur-gears 9ª through the medium of an externally toothed annulus 10, which surrounds the end of the cylindrical piston 2 and rests upon the ring 9ᵈ, which is rigidly mounted upon the cylindrical piston 2, and affords a support to the annulus 10 and the radial arms 9ᶜ. Said annulus is driven by a toothed cylinder 20, upon a vertical shaft 27, which has support in arms 27ª, projecting from the body of the press. The shaft 27 carries, at its lower end, a bevel-gear 27ᵇ which meshes with two bevel gears 27ᶜ and 27ᵈ, both loose upon a counter shaft 31 but capable of being alternately clutched to said shaft by a clutch-box 38, keyed to the counter shaft 31 and operated by means which will be described hereinafter. Rotary motion is communicated from the cylinder 20 to the series of spur-gears which operate the quoins 9, by means of an intermediate gear 21, (Figs. 4 and 11.) The spur-gear 21 revolves two of the gears 9ª, which mesh with it, and also meshes with and operates the toothed annulus 10. The motion of the latter is communicated direct to the spur-gears 21′, 21″, 21‴, and from these spur-gears to the remaining gears 9ª, 9ª, and 9ª, there being two of these gears last named meshed with each of the spur-gears, 21, 21′, 21″, and 21‴.

The mandrel of the press is composed of an outer sheath 13 of hard rubber, and an inner core, or supporting body 14 formed of wood and connected to the press head by a bolt 15. The sheath 13 is provided with a flange 16, said flange resting against the head of the press and being attached thereto by means of an annulus 17, through which screws are inserted and turned into the piece 12. A free space or annular plain surface is left between the annulus 17 and the mandrel 13. The matrix being arranged in position, it only remains to force its parts together, and the mold is ready to shape the exterior surface of the article. To this end the belt is shifted from the loose to the fixed pulley 19, by which the toothed cylinder 20 is turned, and movement communicated to the gear-wheel 21, with which the cylinder is always in mesh. (See Figs. 1, 4 and 11.) From the gear 21 movement is communicated to two of the spur-gears 9ª which mesh with said gear 21, and to the annulus 10, which, in turn, communicates revolution to the gears 21′, 21″, and 21‴, each of which, like the gear 21, intermesh with two of the spur-gears 9ª. These gears turn upon the screws 9″, 9″, which hang from the quoins, and as said gears abut against their rigid bearings, below, and the collar 3, above, they are incapable of other than rotary movement. As the quoins 9 descend, they compel the four parts of the matrix to close, each of the wedge-faces of the quoin being formed for the accomplishment of this result. The quoins are arrested at the moment when the upper part of the matrix rests against the flange 12 of the mandrel 13, with a pressure of one kilogram to the square centimeter, or thereabout.

In order to cause a penetration of the paper into the cavities of the matrix it is necessary to apply an interior pressure to the mandrel, which should be as great as possible in order to distend the hard rubber and force the paper upon and into the engraved stamp in the hollow of the matrix. To effect this, we provide one tap which admits the water to produce a pressure of one hundred kilograms per square centimeter, and another tap giving a pressure of two or three hundred kilograms per square centimeter. This water arrives by way of the tube 24, and the cock 25 in the conduit 26 from which smaller channels divide, or branch off into the wooden core 14 of the hard rubber mandrel 13. The latter is thereby enlarged, and presses the blank against the bottom and sides of the matrix with a force of two or three hundred kilograms per square centimeter. As the body of the press is in communication with the tube 24, the same quantity of pressure forces the upper surface of the matrix against the hard rubber and makes a tight joint. This operation is rendered practicable by reason of the fact that the hard rubber mandrel is capable, within narrow limits, of a certain degree of expansion and collapse, produced by the application and withdrawal of interior pressure in the manner described. As the rubber of which said mandrel is formed is quite thin, it readily bends, or yields, when water is introduced between it and the wooden core, and recovers its normal form when the interior pressure is removed. In this manner the blank is pressed with great force and caused to penetrate all the inscriptions, or marks, graven upon its bottom, notably in the rings, or ribs, sometimes cast upon the base, and in the designs, or markings. It is the same with the depreesion that forms the chine of the box and the narrow edge of the lid. The box having been thus formed the pressure is released and the water is run out of the mandrel. The matrix drops down, carrying with it the finished box, which remains therein, as it has no tendency to adhere to the hard rubber, which is contracted by the suspension of the liquid pressure dilating it. After the descent of the piston press and after the process of formation is completed, the movement of the quoins 9 and 9' is reversed by a change-gear, presently to be described, and the gears $9^a$ operating the threaded bars 9'' are turned in such direction as to raise the quoins. Upon the outside of the ring 5 are arranged four boxes $10^b$ attached to the parts 4 and $4^a$ by bolts $10^c$ and containing springs $10^d$ which bear against the exterior face of the ring 5. When the quoins are raised, the pressure of these springs opens the matrix by drawing its parts asunder.

The top 7 of the press is bolted to the four columns 6, which lie in boxes $6^a$ upon the press-body 1.

The several operations required in using the machine are substantially as follows: First, the matrix being opened, or enlarged, by the retraction of the segmental parts 4 and $4^a$, and the mandrel 13 being raised, the box-blank is placed in the matrix; and second, the mandrel 13 is lowered to place. As the mandrel descends the clutch 38 is operated to engage one of the bevel-gears on the counter-shaft 31, by which such motion is given the toothed cylinder 20 as to revolve the spur-gears $9^a$ and draw the quoins 9 downward, this being the third step. The next and fourth operation is to open the cock giving the lowest fluid-pressure; fifth, to open the cock giving the highest pressure; sixth, to let off the pressure; seventh, to expand the matrix and raise the mandrel; and eighth, to remove the formed box.

Machines operating upon this system can be constructed of all dimensions with matrices to suit.

Figures 13, 14:
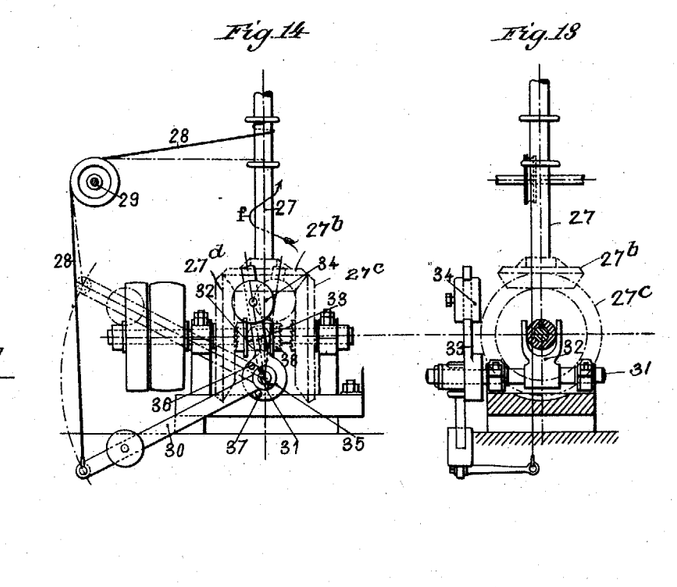
Fig. 13 is a view of the same parts, taken from the opposite side of Fig. 12.
Fig. 14 is an elevation of the same, taken from the front of the machine shown in Figs. 1 and 11.

Mounted on the shaft 27 is a reel or bobbin on which is wound a cord, or chain 28, which passes over a pulley 29 and thence down to the end of a lever 30, which has its other end mounted loosely on a shaft $31^a$ which carries a fork 32 by which the clutch 38 on the counter shaft 31 is shifted. Upon the same shaft $31^a$ is mounted a second lever 33, having a hub 35 which is provided with two pins 36 and 37, between which the lever 30 lies. The lever 33 is provided with a weight 34, the normal position of which is a little to one side, or the other, of a vertical line drawn through the axis of the shaft $31^a$. The weight 34 has sufficient gravity to rock the said shaft and engage the clutch 38 with either one of the bevel gears $27^c$ or $27^d$, whenever the center of gravity of said weight passes to one side or the other of the vertical line drawn through the axis of the shaft $31^a$. This device works as follows: Assuming that the shaft 27 begins to rotate in the direction of the arrow, the counterweighted lever 30 being, at this moment in the position shown by full lines and the toothed bush engaged the bevel wheel 39. The rope 28 is reeled on the bobbin and draws upward the lever 30, without rotating the shaft 31, since the said lever is mounted loosely on this shaft. But, the upward movement being continued, there is a moment where the lever 30 reaches the pin 36. The lever 33 is then rotated toward the right till, having reached the vertical position, it falls toward the right and engages the clutch 38 with the bevel gear $27^d$. The direction of the rotation of shaft 27 is thus changed, the rope 28 is unreeled and the lever 30 is moved downward from its upper position (shown in dotted lines on Fig. 14) by the weight that it bears, till it reaches the pin 37 and moves toward the left the lever 33 which is raised and falls toward the left, engaging the clutch 38 with the bevel gear $27^c$, the weight 34 being sufficient to overcome the weight of the lever 30. The direction of the rotation of the shaft 27 is thus reversed and the same operations are repeated by the further action of the machine.

When it is necessary to arrest the revolution of the gears 21, 21', 21'', and 21''', without relaxing the pressure exerted, the driving belt will simply be shifted from the fast pulley 19 to the loose pulley 18.

What I claim is—

1. In a machine for making paper boxes, the combination with a matrix consisting of several parts normally separated from each other by springs, of quoins movable between the parts of the matrix and a surrounding ring, spur-gears having threaded hubs which mesh with threaded bars forming part of said quoins, a toothed annulus, large gears meshing with said annulus and with the spur gears actuating the quoins, a toothed cylinder meshing with one of said large gears, and means for revolving said cylinder in both directions, substantially as described.

2. In a machine for making paper boxes, the combination with a matrix consisting of a plurality of parts normally separated by springs, of quoins movable between said parts and a surrounding ring, spur-gears having threaded hubs which mesh with threaded bars forming part of said quoins, a toothed annulus, large gears meshing with said annulus and with the spur-gears, a toothed cylinder meshing with one of the large gears, bevel gears loose on a countershaft and meshing with a bevel gear on the shaft of said cylinder, a rock-shaft having a fork engaging a clutch mounted on the countershaft, a lever loose on said rock-shaft, a weighted lever fast on said shaft and having pins on its hub between which the loose lever plays, and a spool on the shaft of the toothed cylinder and having a cord connected to the end of the loose lever, substantially as described.

3. In a machine for making paper boxes, a matrix consisting of several parts, normally separated from each other by springs, quoins movable between the parts of the matrix and a surrounding ring, gears having female threads in their central openings which engage with threaded bars, or screws, on the quoins and means for operating said gears, substantially as described.

4. In a machine for making paper-boxes, the combination with a matrix consisting of a plurality of separable parts, of means for closing and opening the parts of said matrix, a mandrel having a wooden core and a hard-rubber, expansible shell, a pipe introducing water to the press-cylinder and a channel for admitting water to the mandrel between the wooden core and the hard-rubber shell, substantially as described.

In testimony whereof I have signed this specification in the presence of two subscribing witnesses.

PAUL SOHÈGE.

Witnesses:
ROBT. M. HOOPER,
JO. JONES.